G. W. STORER.
Evaporating-Pans.
No. 139,625.
Patented June 3, 1873.
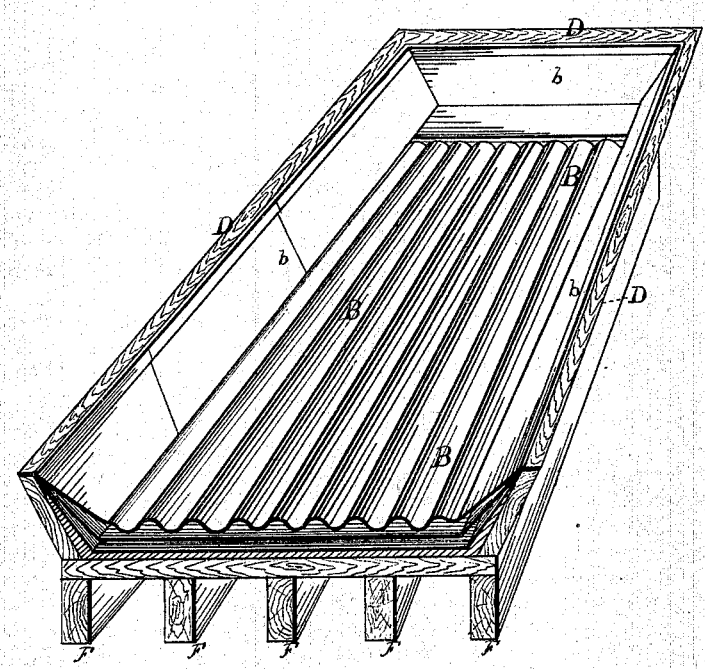
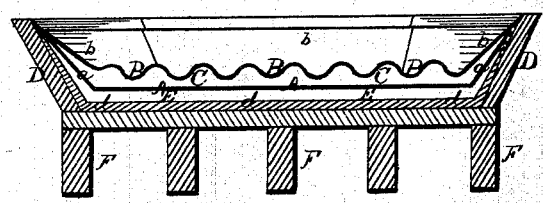
WITNESSES:
Jas. E. Hutchinson
John R. Young
INVENTOR.
George W. Storer, by
Prindle and Co. his Attys

UNITED STATES PATENT OFFICE.

GEORGE W. STORER, OF PHILADELPHIA, PENNSYLVANIA.

IMPROVEMENT IN EVAPORATING-PANS.

Specification forming part of Letters Patent No. 139,625, dated June 3, 1873; application filed March 10, 1873.

*To all whom it may concern:*

Be it known that I, GEORGE W. STORER, of Philadelphia, in the county of Philadelphia and State of Pennsylvania, have invented certain new and useful Improvements in Evaporating-Pans; and do hereby declare that the following is a full, clear, and exact description thereof, reference being had to the accompanying drawing making a part of this specification, in which—

Figure 1 is a perspective view of my improved device, and Fig. 2 is a cross section of the same.

Letters of like name and kind refer to like parts in each of the figures.

The object of my invention is to increase the evaporating capacity of the pan and to lessen the quantity of fuel required for operating the same; and it consists in the peculiar construction of the pan, substantially as and for the purpose hereinafter specified.

In the annexed drawing, A represents a metal pan or vat having a rectangular shape, in plan view, and constructed, preferably, with sides and ends a, which incline inward and downward. Within the pan thus constructed is placed a second pan, B, which has a somewhat less depth and a greater inward inclination of its sides and ends, so as to leave between said latter parts and its bottom and the corresponding portions of said pan A a space, C. The bottom of the inner pan B is corrugated lengthwise, and properly stayed to the bottom of the outer pan A, while the upper edges of their sides and ends a and b are secured together so as to form a steam-tight joint. The pans thus constructed and combined are placed within a wooden vat, D, which, at its upper edge, has just the exterior dimensions of the former, while the shape and dimensions of its lower portion are such as to leave between the same and the bottom, sides, and ends of the pan A an air-space, E. The sides, ends, and bottom of the vat D are covered with a coating of non-heat-conducting material, d, and said vat supported upon or by a suitable frame-work, F, so as to occupy a horizontal position.

The apparatus described is used by placing within the inner pan the liquid to be evaporated, and the admission of steam to the space C between said pan and the outer pan A. The corrugated bottom of the inner pan affords a largely-increased evaporating-surface, upon which and the sides and ends b the steam acts with much effect, while, by means of the air-space E and protected interior of the wooden vat D, the outer surface of the pan A is effectually protected, and but slight, if any, loss of heat occurs in such direction.

Having thus fully set forth the nature and merits of my invention, what I claim as new, is—

The evaporating-vat described, provided with an inner corrugated bottom, B, which is separated from the outer bottom A by means of a steam-space, C, and the whole protected upon its sides and bottom by means of the wooden vat D, non-conducting covering d, and air-space E, substantially as and for the purpose specified.

In testimony whereof I have hereunto set my hand this 27th day of February, 1873.

GEO. W. STORER.

Witnesses:
WM. MCGEORGE, Jr.,
GEORGE W. THURSTON.